(12) United States Patent
Uno et al.

(10) Patent No.: US 10,392,781 B2
(45) Date of Patent: Aug. 27, 2019

(54) WHEEL LOADER

(71) Applicant: KCM Corporation, Inami-cho, Kako-gun, Hyogo (JP)

(72) Inventors: Kohtaroh Uno, Ibaraki (JP); Shoroku Kawahara, Ibaraki (JP); Keigo Kikuchi, Ibaraki (JP); Koji Hyodo, Ibaraki (JP); Atsushi Shimazu, Ibaraki (JP)

(73) Assignee: KCM Corporation, Hyogo (JP)

( * ) Notice: Subject to any disclaimer, the term of this patent is extended or adjusted under 35 U.S.C. 154(b) by 0 days.

(21) Appl. No.: 16/288,941

(22) Filed: Feb. 28, 2019

(65) Prior Publication Data

US 2019/0226179 A1 Jul. 25, 2019

Related U.S. Application Data

(63) Continuation of application No. 14/914,663, filed as application No. PCT/JP2014/077458 on Oct. 15, 2014.

(30) Foreign Application Priority Data

Nov. 8, 2013 (JP) ................ 2013-232100

(51) Int. Cl.
*E02F 9/22* (2006.01)
*F02D 29/04* (2006.01)
*E02F 9/20* (2006.01)
*E02F 3/43* (2006.01)
*E02F 3/28* (2006.01)
(Continued)

(52) U.S. Cl.
CPC ............ *E02F 9/2253* (2013.01); *E02F 3/283* (2013.01); *E02F 3/431* (2013.01); *E02F 9/02* (2013.01); *E02F 9/0841* (2013.01); *E02F 9/2066* (2013.01); *E02F 9/2289* (2013.01); *E02F 9/2296* (2013.01); *F02D 29/04* (2013.01); *F16H 61/468* (2013.01)

(58) Field of Classification Search
CPC ........ E02F 9/2066; E02F 9/2253; F02D 29/04
USPC .......................................................... 701/50
See application file for complete search history.

(56) References Cited

U.S. PATENT DOCUMENTS 7,533,527 B2   5/2009  Naruse
7,631,495 B2  12/2009  Naruse
(Continued)

FOREIGN PATENT DOCUMENTS

JP  2008-223899 A  9/2008
JP  2011-127473 A  6/2011
(Continued)

*Primary Examiner* — Erin D Bishop
(74) *Attorney, Agent, or Firm* — Crowell & Moring LLP (57) ABSTRACT

To improve working efficiency in an eco mode when a power mode and the eco mode have been set in a wheel loader, the wheel loader is provided with a controller having an eco mode characteristic line, a power mode characteristic line, and a lifting operation characteristic line having a matching point C located between a matching point A between a working device operating engine torque characteristic line and the eco mode characteristic line and a matching point B between the working device operating engine torque characteristic line and the power mode characteristic line. The controller includes a control portion, which controls a HST pump in accordance with the lifting operation characteristic line when lifting operation of a lift arm is detected while the eco mode has been selected by a work mode selecting portion.

8 Claims, 8 Drawing Sheets

(51) Int. Cl.
*F16H 61/468* (2010.01)
*E02F 9/02* (2006.01)
*E02F 9/08* (2006.01)

(56) References Cited

U.S. PATENT DOCUMENTS

| | | |
|---|---|---|
| 7,865,288 B2 | 1/2011 | Fukushima et al. |
| 2004/0010359 A1 | 1/2004 | Koch |
| 2012/0177470 A1 | 7/2012 | Ohhigashi et al. |
| 2013/0259619 A1 | 10/2013 | Shirao |

FOREIGN PATENT DOCUMENTS

| | | |
|---|---|---|
| JP | 2011-157972 A | 8/2011 |
| JP | 2012-002161 A | 1/2012 |
| JP | 2012-154302 A | 8/2012 |
| JP | 2013-36275 A | 2/2013 |
| KR | 10-2012-0044357 A | 5/2012 |
| WO | WO 2007/097665 A1 | 8/2007 |

WHEEL LOADER

CROSS REFERENCE TO RELATED APPLICATIONS

This application is a continuation of and claims priority to U.S. application Ser. No. 14/914,663, the entire disclosure of which is expressly incorporated herein, which entered the PCT U.S. national phase on Feb. 26, 2016, as a 371 of International Application No. PCT/JP2014/077458, filed Oct. 15, 2014, the entire disclosure of which is also expressly incorporated herein, the priority of which is also claimed here, which in turn claims priority from Japanese Patent Application No. 2013-232100, filed Nov. 8, 2013, the entire disclosure of which is also expressly incorporated by reference herein, priority of which is also claimed here.

TECHNICAL FIELD

The present invention relates to a wheel loader having an HST type driving system.

BACKGROUND ART

As this type of wheel loader, there is a wheel loader which has been disclosed in Patent Literature 1. The wheel loader is provided with wheels, a vehicle body frame with an operator's cab, a working device, etc. The working device is provided with a lift arm which moves in an up/down direction, and a bucket which is attached to a distal end of the lift arm.

As this type of wheel loader, there is a wheel loader having an HST type driving system. The HST type driving system is provided with an HST pump and an HST motor which form a closed circuit, a working machine pump which discharges pressure oil for driving the working device, and a driving wheel system which operates in response to an output from the HST motor.

CITATION LIST

Patent Literature

Patent Literature 1: JP-A-2008-223899

SUMMARY OF INVENTION

Technical Problem

In order to achieve an energy saving effect, it can be considered that a power mode and an eco mode are set for control of the HST pump and the HST motor in the aforementioned wheel loader having the HST type driving system. The power mode supports heavy-load excavation. In the eco mode attaching importance to a fuel consumption reduction effect, engine speed is suppressed to be lower than that in the power mode.

However, it can be considered that the wheel loader which has been configured thus to have the eco mode has the following disadvantage. That is, the working machine pump is also directly connected to the engine and the HST pump. The discharge flow rate of the working machine pump is determined in accordance with rotation speed of an input shaft directly connected to the engine. Accordingly, when soil which has been, for example, held by a bucket of the working device is lifted up by the lift arm in the eco mode, operation speed of the working device may become slow to thereby lower working efficiency.

Figure 8:
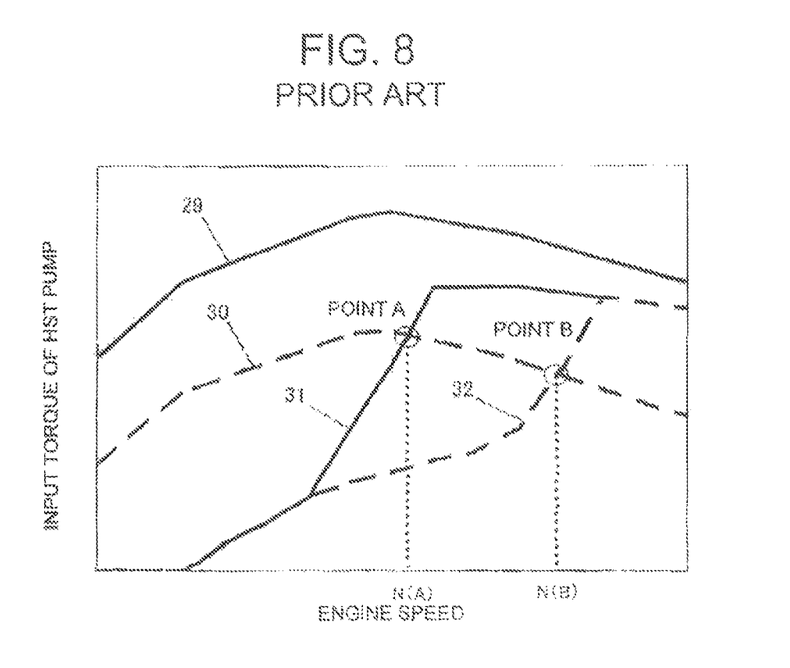
FIG. 8 A graph showing characteristics considered from the background-art technique.

FIG. 8 is a graph showing input torque characteristics of the HST pump relative to the engine speed, which have been considered from the aforementioned background-art technique. In FIG. 8, the reference sign 32 designates a power mode characteristic; 31, an eco mode characteristic; 29, an engine torque characteristic; and 30, an engine torque characteristic which is obtained by subtracting input torque of the working machine pump during driving of the working device from the engine torque characteristic 29. The engine torque characteristic 30 expresses engine torque which can be consumed by the HST pump. Assume that traveling operation is performed while the working device is driven. In this case, in the power mode, the engine is driven at a matching point B and engine speed N(B) corresponds to higher rotation speed. On the other hand, in the eco mode, the engine is driven at a matching point A at which the engine speed is lower than that at the matching point B due to a larger increase rate of the input torque of the HST pump with respect to the increase of the engine speed. Therefore, rotation speed N(A) corresponds to lower engine speed. Thus, the speed of the working device becomes slower.

The invention has been accomplished in consideration of the aforementioned real circumstances in the background-art technique. It is an object of the invention to provide a wheel loader which has an HST type driving system and which can improve working efficiency in an eco mode in the case where a power mode and the eco mode have been set in the wheel loader.

Solution to Problem

In order to achieve the object, the invention provides a wheel loader including: a vehicle body frame; wheels; a working device which is attached to the vehicle body frame and which has a lift arm capable of being rotated in an up/down direction; an engine which is attached to the vehicle body frame; an HST traveling device in which a variable displacement type HST pump driven by the engine and an HST motor as a driving source for driving the wheels are connected to each other in a closed circuit, and which has an HST pump control portion controlling input torque of the HST pump; and a working machine pump which is driven by the engine to discharge pressure oil for operating the working device; wherein: the wheel loader further includes: a work mode selecting device which selects one from a power mode and an eco mode, the power mode serving as a work mode when the workload is a heavy load, the eco mode serving as a work mode when the workload is a light load; a detecting device which detects lifting operation of the lift arm of the working device; and a control device which makes control so that the input torque of the HST pump can be controlled in accordance with a preset eco mode characteristic by the pump control portion when the eco mode is selected by the work mode selecting device, and the input torque of the HST pump can be controlled in accordance with a preset power mode characteristic by the pump control portion when the power mode is selected by the work mode selecting device, but the input torque characteristic of the HST pump can be controlled in accordance with a lifting operation characteristic in place of the eco mode characteristic when the lifting operation of the lift arm is detected by the detecting device after the eco mode has been selected.

The invention also provides a wheel loader having the aforementioned configuration, wherein: the control device has a storage portion which stores an eco mode characteristic line, a power mode characteristic line, and a lifting operation characteristic line; each of the eco mode characteristic line, the power mode characteristic line and the lifting operation characteristic line includes a characteristic line expressing a relation between engine speed and the input torque of the HST pump; and the lifting operation characteristic line is set as a characteristic in which a matching point as an intersection point of the lifting operation characteristic line with a working device operating engine torque characteristic line obtained by subtracting torque of the working machine pump from torque of the engine is provided between an eco mode matching point as an intersection point between the eco mode characteristic line and the working device operating engine torque characteristic line and a power mode matching point as an intersection point between the power mode characteristic line and the working device operating engine torque characteristic line.

The invention also provides a wheel loader having the aforementioned configuration, wherein: the lifting operation characteristic line is provided to diverge from the middle of the eco mode characteristic line.

The invention also provides a wheel loader having the aforementioned configuration, including: a multistage transmission which is connected to the HST motor and which has a plurality of speed stages including a high speed stage and a low speed stage; a speed stage detecting device which detects that the multistage transmission has been changed over to the low speed stage; and a forward movement detecting sensor which detects that the wheel loader is in a state of forward movement; wherein: the HST motor includes a variable displacement type hydraulic motor; the HST traveling device has an HST motor control portion which controls tilting of the HST motor; and when it is detected by the speed stage detection device that the multistage transmission has been changed over to the low speed stage and it is detected by the forward movement detecting sensor that the wheel loader is in a state of forward movement, the control device makes control so that minimum tilting of the HST motor can be set as minimum tilting larger than minimum tilting in the eco mode by the HST motor control portion.

Advantageous Effects of Invention

According to the invention, when the lifting operation of the lift arm of the working device is performed in the eco mode in the case where the power mode and the eco mode has been set in the wheel loader having the HST type driving system, the HST pump is controlled in accordance with the lifting operation characteristic line so that the engine speed can be higher than that in the eco mode. Thus, according to the invention, it is possible to increase operation speed of the lifting operation of the lift arm of the working device so that it is possible to improve working efficiency more greatly than in the background art. In addition, according to the invention, the lifting operation characteristic line is set to diverge from the eco mode characteristic line. Accordingly, it is possible to carry out the lifting operation of the lift arm in the eco mode while reducing an operator's feeling of difference from a feeling of operation in the eco mode.

DESCRIPTION OF EMBODIMENTS

Embodiments of a wheel loader according to the invention will be described below based on the drawings.

First Embodiment

Figure 1:
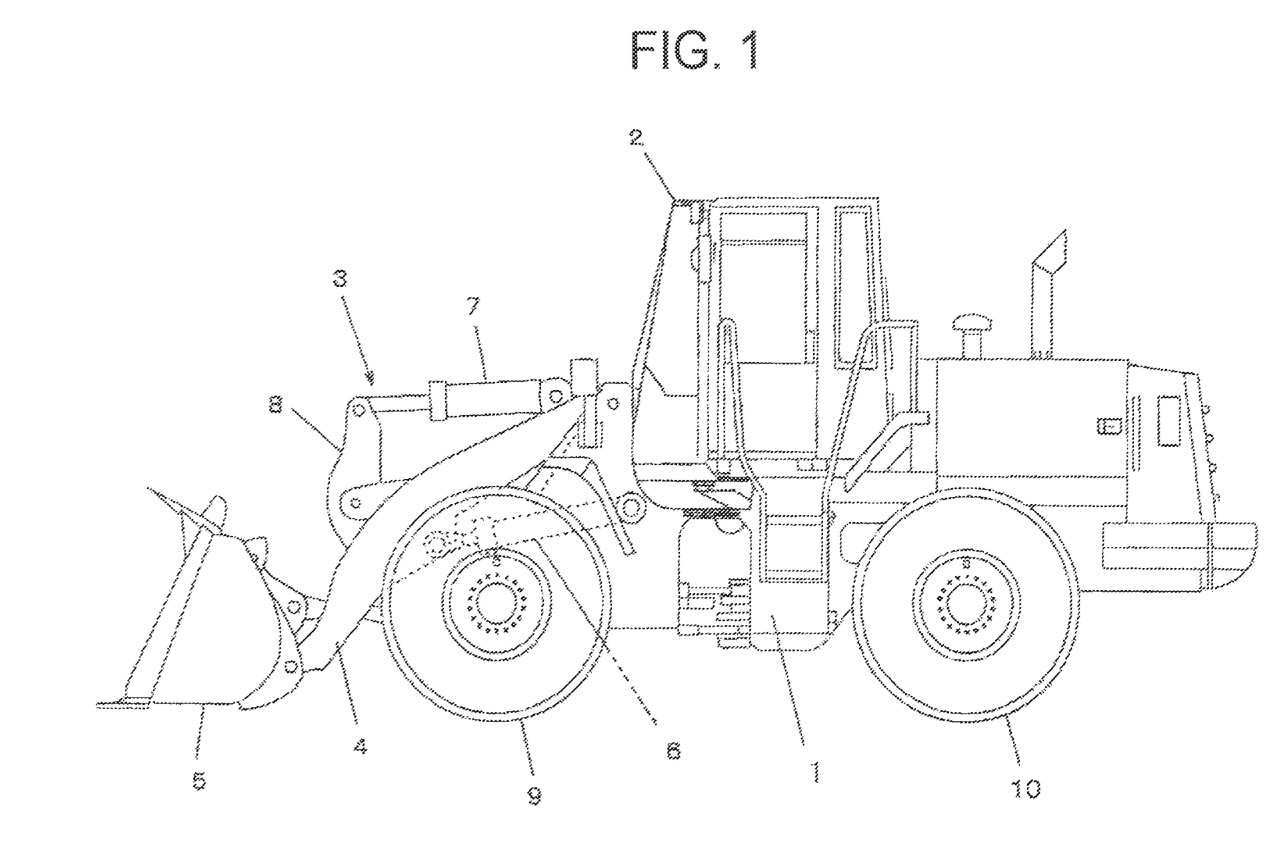
FIG. 1 A side view showing a first embodiment of a wheel loader according to the invention.

FIG. 1 is a side view showing a first embodiment of a wheel loader according to the invention. As shown in FIG. 1, the wheel loader according to the first embodiment is provided with a vehicle body frame 1, an operator's cab 2, wheels, i.e. front wheels 9 and rear wheels 10, and a working device 3. The working device 3 is attached to the vehicle body frame 1. The working device 3 includes a lift arm 4, a lift cylinder 6, a bucket 5, a bucket cylinder 7, and a bellcrank 8. The lift arm 4 can be rotated in an up/down direction. The lift cylinder 6 drives the lift arm 4. The bucket 5 is attached to a distal end of the lift arm 4 so that the bucket 5 can be loaded with soil. The bucket cylinder 7 rotates the bucket 5 in the up/down direction. The bellcrank 8 forms a link mechanism between the bucket 5 and the bucket cylinder 7.

Figure 2:
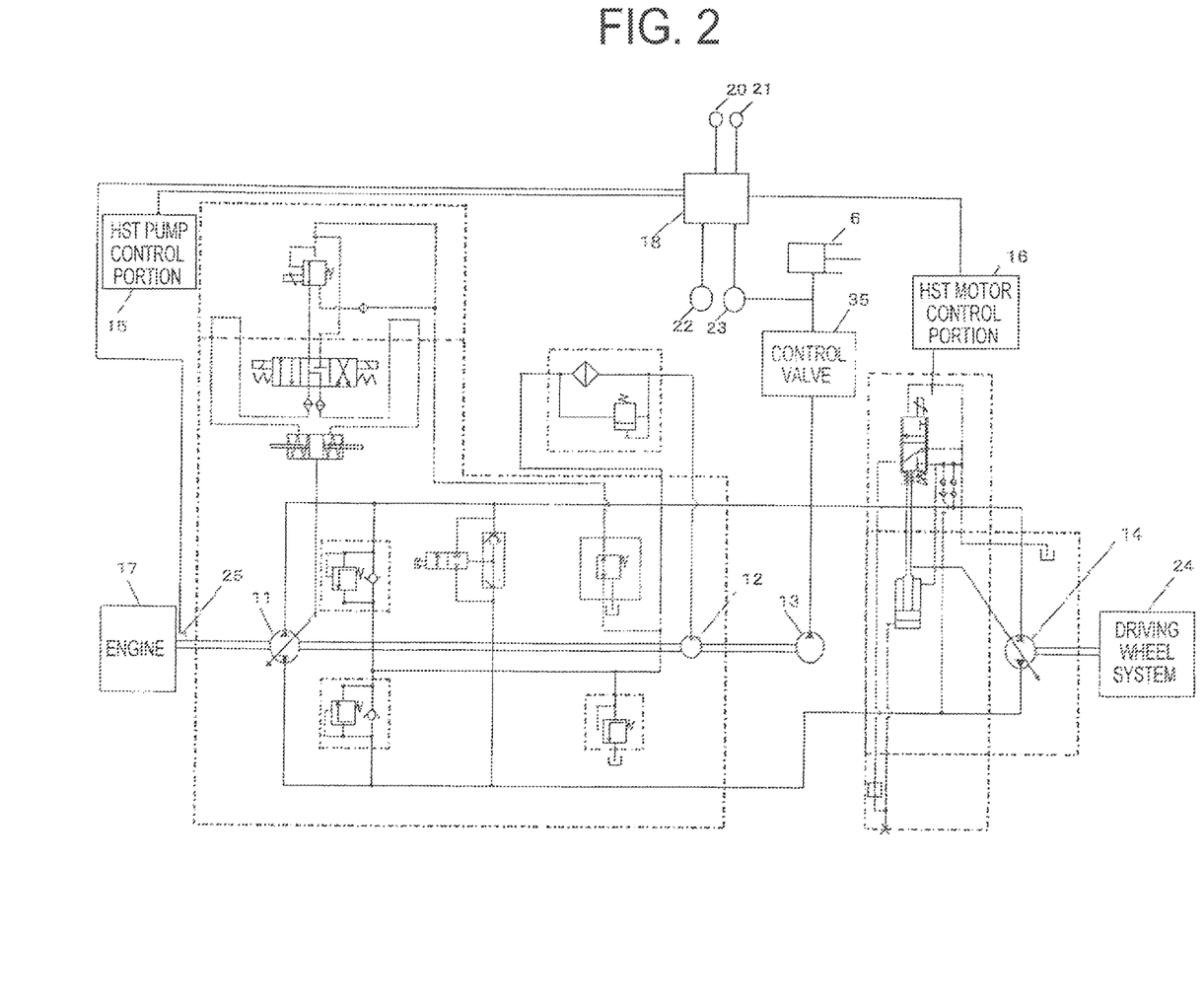
FIG. 2 An electric and hydraulic circuit diagram provided in the first embodiment.

FIG. 2 is an electric and hydraulic circuit diagram provided in the first embodiment.

As shown in FIG. 2, the first embodiment is provided with an engine 17, a hydraulic closed circuit, and a working machine pump 13. The engine 17 is attached to the vehicle body frame 1. The hydraulic closed circuit includes a variable displacement type HST pump 11 which is driven by the engine 17, and an HST motor 14 which is driven by pressure oil discharged from the HST pump 11. The working machine pump 13 is driven by the engine 17 to discharge pressure oil for operating the working device 3. Further, the first embodiment has an HST charge pump 12 and a driving wheel system 24. The HST charge pump 12 discharges pressure oil for controlling the HST pump 11. The driving wheel system 24 transmits driving force generated by the HST motor 14 to the front wheels 9 and the rear wheels 10. The pressure oil discharged from the working machine pump 13 is delivered to the lift cylinder 6 serving as the working device 3 through a control valve 35.

The first embodiment is also provided with a detecting portion, a work mode selecting portion 22 and an engine speed sensor 25. The detecting portion detects lifting operation of the lift arm 4 of the working device 3. For example, the detecting portion is a working machine pressure detecting portion 23 which detects pressure of a conduit making communication between the control valve 35 and a bottom chamber of the lift cylinder 6. The work mode selecting portion 22 selects one from a power mode and an eco mode. The power mode serves as a work mode when the workload is a heavy load. The eco mode serves as a work mode when the workload is a light load. The engine speed sensor 25 detects real rotation speed of the engine 17. The first embodiment is further provided with a control device, i.e. a controller 18, to which pieces of information are inputted from the working machine pressure detecting portion 23, the work mode selecting portion 22 and the engine speed sensor 25. Information outputted from the controller 18 is sent to an HST pump control portion 15 and an HST motor control portion 16. The HST pump control portion 15 controls tilting (pump input torque) of the HST pump 11 in accordance with a command from the controller 18. The HST motor control portion 16 controls tilting (motor output torque) of the HST motor 14 in accordance with a command from the controller 18.

Incidentally, the controller 18 controls the HST pump control portion 15 so as to increase the pump tilting (pump input torque) in accordance with the increase of the engine speed. In addition, the controller 18 controls the HST motor control portion 16 so as to increase the motor tilting (motor output torque) more toward maximum tilting as discharge pressure of the HST pump (driving pressure of the HST motor 15) is higher and so as to decrease the motor tilting more toward minimum tilting as the discharge pressure of the HST pump is lower.

Traveling torque increases as the motor tilting is larger. Travelling speed increases as the motor tilting is smaller. Thus, the travelling speed can reach the highest speed at the minimum tilting. Thus, low-speed high-torque traveling and high-speed low-torque traveling are achieved.

Figure 3:
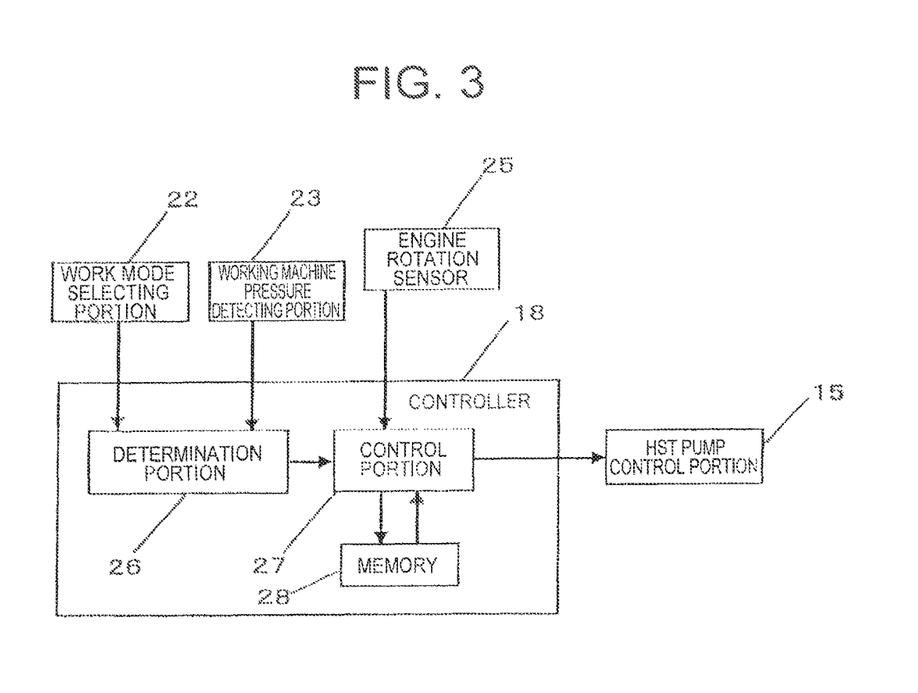
FIG. 3 A block diagram showing a control system provided in the first embodiment.
Figure 4:
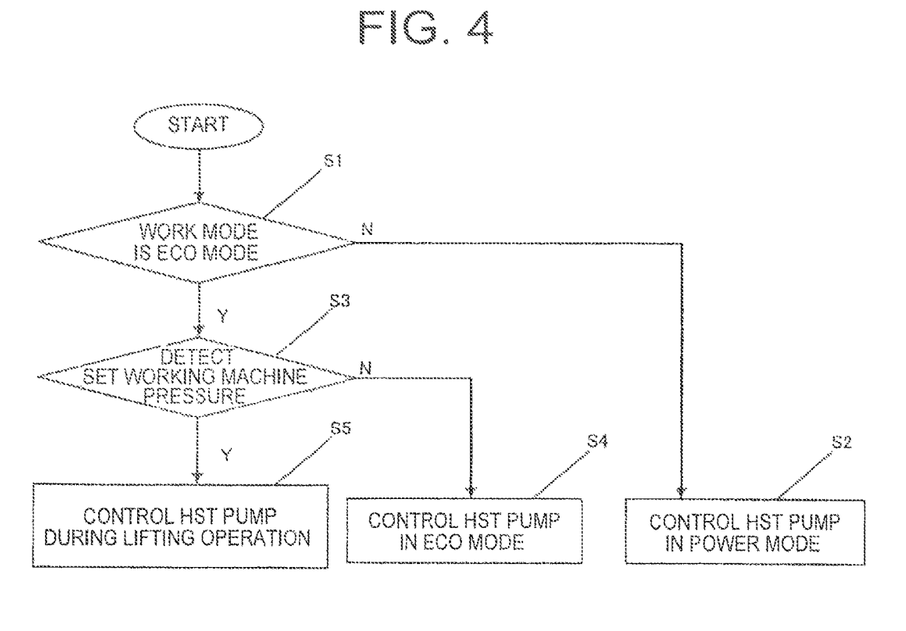
FIG. 4 A flow chart showing a processing procedure of a vehicle body controller provided in the first embodiment.
Figure 5:
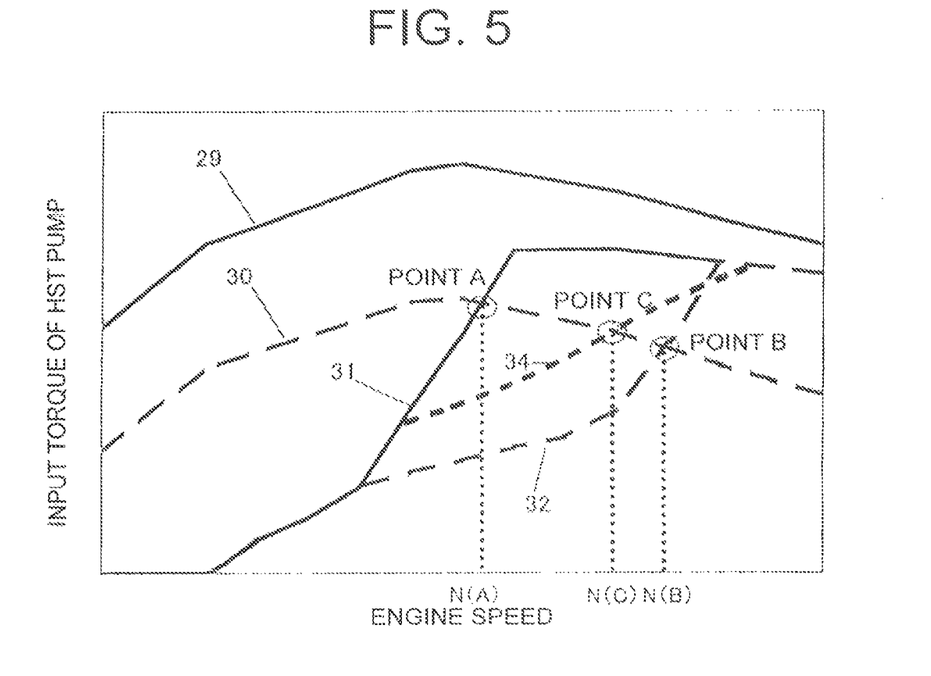
FIG. 5 A graph showing characteristics obtained in the first embodiment.

FIG. 3 is a block diagram showing a control system provided in the first embodiment. FIG. 4 is a flow chart showing a processing procedure of the vehicle body controller provided in the first embodiment. FIG. 5 is a graph showing characteristics obtained by the first embodiment.

The controller 18 shown in FIG. 3 has a storage portion 28 (see FIG. 3) which stores the relation of the input torque of the HST pump to the engine speed as a map as shown in FIG. 5. An eco mode characteristic line 31, a power mode characteristic line 32, a matching point A, a matching point B, and a lifting operation characteristic line 34 are stored in advance in the map. The eco mode characteristic line 31 expresses the relation between the eco mode engine speed which is used when the eco mode is selected by the work mode selecting portion 22, and the input torque of the HST pump 11. The power mode characteristic line 32 expresses the relation between the power mode engine speed which is used when the power mode is selected, and the input torque of the HST pump. The matching point A is located on a working device operating engine torque characteristic line 30 which is obtained by subtracting the torque of the working machine pump 13 from the torque of the engine 17 (a characteristic line 29). The matching point A is an intersection point between the eco mode characteristic line 31 and the working device operating engine torque characteristic line 30. The matching point B is an intersection point between the power mode characteristic line 32 and the working device operating engine torque characteristic line 30. The lifting operation characteristic line 34 has a matching point C which is an intersection point with the working device operating engine torque characteristic line 30 and between the matching point A and the matching point B. The lifting operation characteristic line 34 is set to diverge from the eco mode characteristic line 31 and expresses the relation between the engine speed during the lifting operation of the lift arm 4 and the input torque of the HST pump.

The input torque of the HST pump during operation of the working device matches with an intersection point on the working device operating engine torque characteristic line 30. The engine 17 is operated at the rotation speed at the intersection point. The eco mode characteristic line 31 is set in such a manner that the input torque of the HST pump increases at a larger increase rate relative to the increase of the engine speed. The engine speed at the matching point A corresponds to lower rotation speed N(A). Thus, the engine is operated at lower rotation speed so that fuel consumption can be improved. The power mode characteristic line 32 is set in such a manner that the input torque of the HST pump increases more gently relatively to the increase of the engine speed than in the eco mode characteristic line 31. Engine speed N(B) at the matching point B corresponds to a higher value than the engine speed N(A) at the matching point A. Therefore, the engine can be operated at higher rotation speed to increase the discharge flow rate of the working machine pump 13 to thereby increase the driving speed of the lift arm 4 etc. of the working device 3. Thus, it is possible to improve workability. The lifting operation characteristic line 34 diverges from the middle of the eco mode characteristic line 31. The lifting operation characteristic line 34 is set in such a manner that, up to the divergence point, the input torque of the HST pump increases at a larger increase rate relative to the increase of the engine speed in the same manner as in the eco mode characteristic line 31, but beyond the divergence point, the input torque of the HST pump increases gently relatively to the increase of the engine speed, for example, substantially at the same increase rate as in the power mode characteristic line 32. Engine speed N(C) at the matching point C is a value larger than the engine speed N(A) but smaller than the engine speed N(B). The characteristic of the engine speed N(C) is set so that the engine speed N(C) can be a value close to the engine speed N(B).

In addition, as shown in FIG. 3, the controller 18 is provided with a determination portion 26, a storage portion 28, and a control portion 27. The determination portion 26 determines whether the lifting operation of the lift arm 4 of the working device 3 has been detected or not by the working machine pressure detecting portion 23 in the condition that the eco mode has been selected by the work mode selecting portion 22. The characteristics shown in FIG. 5 are stored in the storage portion 28. The control portion 27 controls the HST pump 11 in accordance with the lifting operation characteristic line 34 in place of the eco mode characteristic line 31 when it is determined by the determination portion 26 that the lifting operation of the lift arm 4 has been detected.

As shown in FIG. 4, first, the determination portion 26 of the controller 18 determines whether the eco mode has been selected as the work mode or not (step S1). When the eco mode has not been selected, control of the HST pump 11 is made in accordance with the power mode characteristic line 32 shown in FIG. 5 (step S2). When pressure is detected by the working machine pressure detecting portion 23 in the case where the eco mode has been selected, determination is made as to whether the lift arm 4 has been lifted or not (step S3). When the set working machine pressure is not detected, determination is made that the lift arm 4 has not been lifted yet so that control of the HST pump 11 is made in accordance with the eco mode characteristic line 31 shown in FIG. 5 (step S4). When the set working machine pressure is detected, determination is made that the lift arm 4 has been lifted so that control of the HST pump is made in accordance with the lifting operation characteristic line 34 shown in FIG. 5 (step S5).

Incidentally, in FIG. 5, the reference sign 29 designates an engine output torque characteristic line corresponding to torque obtained as the sum of the input torque of the HST pump and the input torque of the working machine pump. As described above, the working device operating engine torque characteristic line 30 is a torque characteristic line relevant to the engine 17 and corresponding to torque obtained by subtracting the input torque of the working machine pump from the output torque of the engine. The input torque of the HST pump during acceleration from a stop state of the vehicle body is expressed by the eco mode characteristic line 31, the power mode characteristic line 32 and the lifting operation characteristic line 34 in FIG. 5. In the power mode, the engine speed N(B) corresponds to higher rotation speed as indicated at the matching point B. On the other hand, in the eco mode, the rotation speed N(A) corresponds to lower engine speed as indicated at the matching point A, and the discharge flow rate of the working machine pump 13 decreases accordingly. However, in the lifting operation characteristic line 34, since the engine speed N(C) as indicated at the matching point C can be set as rotation speed higher than the engine speed N(A), the discharge flow rate of the working machine pump 13 close to that in the power mode can be obtained in spite of the eco mode.

According to the first embodiment configured thus, when the lifting operation of the lift arm 4 of the working device 3 in the wheel loader having the HST type driving system has been performed in the eco mode, the HST pump 11 is controlled in accordance with the lifting operation characteristic line 34 stored in the storage portion 28 of the controller 18 so that the engine speed can be increased to be higher than that in the eco mode. Such lifting operation of the lift arm 4 is carried out when soil held by the bucket 5 is loaded into a truck etc. or released to a mound of sediment. In this manner, according to the first embodiment, it is possible to increase the operation speed of the lifting operation of the working device 3 so that it is possible to improve working efficiency.

In addition, the lift operation characteristic line 34 is set to diverge from the eco mode characteristic line 31 in the first embodiment. Accordingly, it is possible to carry out the lifting operation of the lift arm 4 in the eco mode while reducing an operator's feeling of difference from a feeling of operation in the eco mode.

Second Embodiment

Figure 6:
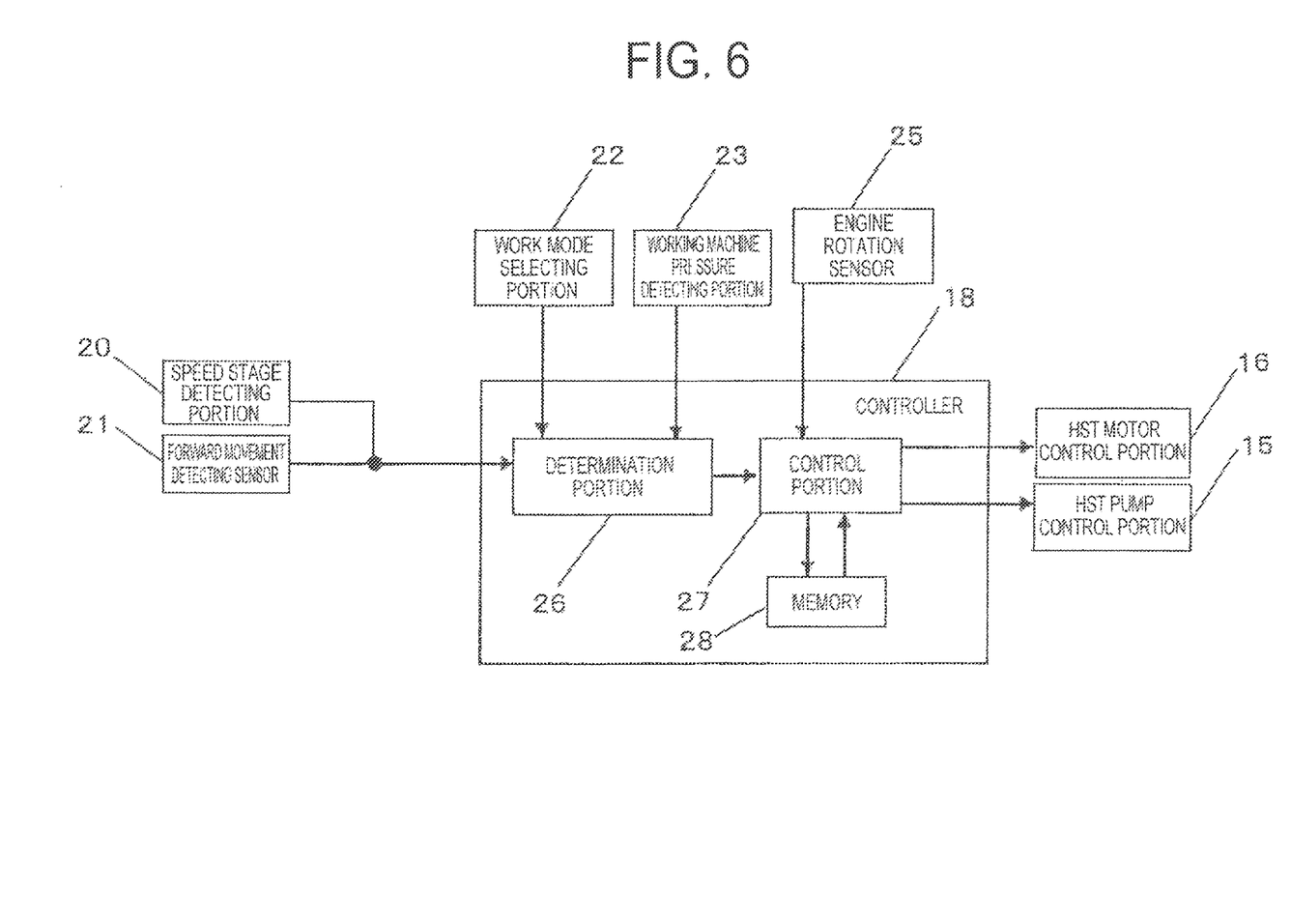
FIG. 6 A block diagram showing a control system provided in a second embodiment of the invention.
Figure 7:
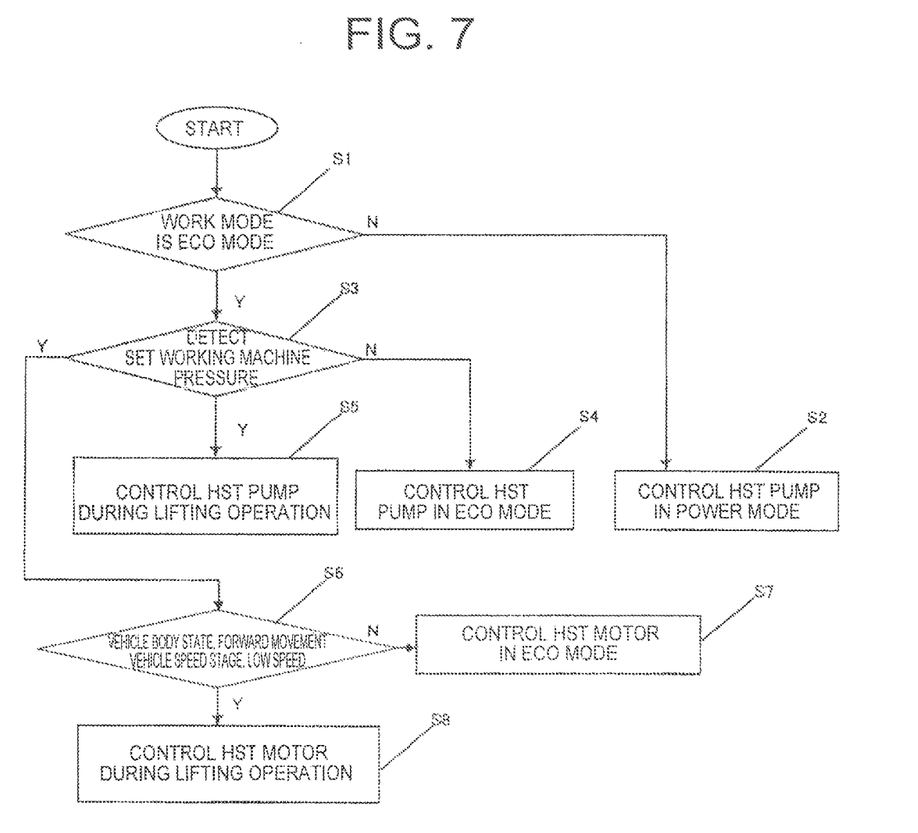
FIG. 7 A flow chart showing a processing procedure of a vehicle body controller provided in the second embodiment.

FIG. 6 is a block diagram showing a control system provided in a second embodiment of the invention. FIG. 7 is a flow chart showing a processing procedure of a vehicle body controller provided in the second embodiment. The fundamental configuration of the second embodiment is equivalent to that of the first embodiment. Only different parts will be described below.

The second embodiment is provided with a not-shown multistage transmission, a speed stage detecting portion 20, and a forward movement detecting sensor 21. The multistage transmission is connected to an HST motor 14 and is formed as a constituent part of a driving wheel system 24. The multistage transmission changes rotation of the HST motor 14 to one of a high speed stage and a low speed stage so as to change the speed. The speed stage detecting portion 20 detects that the multistage transmission has been changed over to the low speed stage as shown in FIG. 6. The forward movement detecting sensor 21 detects that the vehicle body of the wheel loader is in a state of forward movement.

In addition to the determination made in the first embodiment, a determination portion 26 of a controller 18 is configured to also determine whether or not it has been detected by the speed stage detecting portion 20 that the multistage transmission has been changed over to the slow speed stage and it has been detected by the forward movement detecting sensor 21 that the wheel loader is in the state of forward movement. A control portion 27 is configured to also output a control signal to an HST motor control portion 16.

In the second embodiment, as shown in the flow chart of FIG. 7, when pressure is detected by a working machine pressure detecting portion 23 so that determination is made that a lift arm 4 has been lifted in a step S3, control of an HST pump 11 is made in accordance with a lifting operation characteristic line 34 in a step S5. Moreover, when it is determined by the determination portion 26 of the controller 18 that the multistage transmission has been changed over to the low speed stage and the wheel loader is in the state of forward movement (step S6), the control portion 27 of the controller 18 outputs a control signal to the HST motor control portion 15 to make control so that minimum tilting of the HST motor 14 can be set as minimum tilting larger than minimum tilting in an eco mode (step S8). When the condition is not consistent with any of the low speed stage and the state of forward movement, the control portion 27 controls the HST motor control portion 15 to keep the minimum tilting of the HST motor 14 at the same minimum titling as that in the eco mode (step S7).

According to the second embodiment, not only is it possible to obtain an equivalent effect to that in the first embodiment but it is also possible to reduce the vehicle speed to be lower than that in the eco mode in the background art when the speed of the vehicle body is accelerated from a stop state or a very slow speed region during lifting operation of the lift arm 4 of the working device 3, i.e. when soil held by a bucket 5 is loaded into a truck etc. or released to a mound of sediment.

Here, operation speed of the working device 3 and traveling speed in a power mode are set to be balanced with each other in consideration of workability and operability in the wheel loader according to the background-art technique. Therefore, there is a fear that the balance between the operation speed of the lift arm 4 of the working device 3 and the vehicle speed in the eco mode may be poor to lower working efficiency. That is, since the vehicle speed is higher relatively to the operation speed of the lift arm 4 of the working device 3 in the eco mode in the wheel loader according to the background-art technique, the traveling distance tends to be longer, and further, there arises a difference in operability between the power mode and the eco mode. Therefore, when equivalent work to loading work etc. performed in the power mode is intended to be performed in the eco mode, the traveling distance required for the work in the eco mode becomes longer than that in the power mode. Accordingly, it is difficult to do the work in a narrow work site.

According to the second embodiment, the minimum tilting of the HST motor 14 is set as the larger minimum tilting as described above so that the vehicle speed can be reduced when soil held by the bucket 5 is loaded into a truck etc. or released to a mound of sediment. Accordingly, it is possible to improve the balance between the operation speed of the lift arm 4 of the working device 3 and the vehicle speed so that it is possible to increase the working efficiency. In addition, when the same work such as work for loading soil held by the bucket 5 into a truck etc. or work for releasing soil to a mound of sediment is performed, it is possible to make the traveling distance substantially equal between the power mode and the eco mode.

REFERENCE SIGNS LIST 1 vehicle body frame
3 working device
4 lift arm
5 bucket
6 lift cylinder
7 bucket cylinder
8 bellcrank
11 HST pump
12 HST charge pump
13 working machine pump
14 HST motor
15 HST pump control portion
16 HST motor control portion
17 engine
18 controller (control device)
20 speed stage detecting portion (speed stage detecting device)
21 forward movement detecting sensor
22 work mode selecting portion (work mode selecting device)
23 working machine pressure detecting portion (detecting device)
24 driving wheel system
25 engine speed sensor
26 determination portion
27 control portion
28 storage portion
29 engine torque characteristic line
30 working device operating engine torque characteristic line
31 eco mode characteristic line
32 power mode characteristic line
34 lifting operation characteristic line

The invention claimed is:

1. A wheel loader comprising:
a vehicle body frame;
wheels;
a working device which is attached to the vehicle body frame and which has a lift arm capable of being rotated in an up/down direction;
an engine which is attached to the vehicle body frame;
a working machine pump which is driven by the engine to discharge pressure oil for operating the working device;
a variable displacement type HST pump driven by the engine;
an HST motor which is closed-connected to the HST pump for driving the wheels; and
a controller which is adapted to control an input torque of the HST pump by controlling tilting of the HST pump based on either a power mode or an eco mode; wherein
the controller is further adapted to
control the input torque of the HST pump in accordance with a preset eco mode characteristic in case that the eco mode is selected,
control the input torque of the HST pump in accordance with a preset power mode characteristic in case that the power mode is selected, and
control an input torque characteristic of the HST pump in accordance with a lifting operation characteristic in place of the eco mode characteristic in case that a lifting operation of the lift arm is detected and the eco mode is selected.

2. The wheel loader according to claim 1, wherein:
each of the preset eco mode characteristic, the preset power mode characteristic and the preset lifting operation characteristic includes a characteristic line expressing a relation between engine speed and the input torque of the HST pump, and
the lifting operation characteristic line is set as a characteristic in which a matching point as an intersection point of the lifting operation characteristic line with a working device operating engine torque characteristic line expressed by the relationship between torque obtained by subtracting the torque of the working machine pump from the torque of the engine and the engine speed is provided between a matching point as an intersection point between the eco mode characteristic line and the working device operating engine torque characteristic line and a matching point as an intersection point between the power mode characteristic line and the working device operating engine torque characteristic line.

3. The wheel loader according to claim 2, wherein:
the lifting operation characteristic line is provided to diverge from the middle of the eco mode characteristic line.

4. The wheel loader according to claim 2, further comprising a multistage transmission which is connected to the HST motor and which has a plurality of speed stages including a high speed stage and a low speed stage, wherein:
the HST motor includes a variable displacement type hydraulic motor; and
a second controller is adapted to perform control to set a minimum tilting of the HST motor to be larger than a minimum tilting in the eco mode in case that it is detected that the multistage transmission has been changed over to the low speed stage and it is detected that the wheel loader is in a state of forward movement.

5. The wheel loader according to claim 4, wherein:
the lifting operation characteristic line is provided to diverge from the middle of the eco mode characteristic line.

6. The wheel loader according to claim 1, further comprising a multistage transmission which is connected to the HST motor and which has a plurality of speed stages including a high speed stage and a low speed stage, wherein:
the HST motor includes a variable displacement type hydraulic motor; and
a second controller is adapted to perform control to set a minimum tilting of the HST motor to be larger than a minimum tilting in the eco mode in case that it is detected that the multistage transmission has been changed over to the low speed stage and it is detected that the wheel loader is in a state of forward movement.

7. The wheel loader according to claim 6,
wherein:
each of the preset eco mode characteristic, the preset power mode characteristic and the preset lifting operation characteristic includes a characteristic line expressing a relation between engine speed and the input torque of the HST pump, and
the lifting operation characteristic line is provided to diverge from the middle of the eco mode characteristic line.

8. The wheel loader according to claim 1,
wherein:

each of the preset eco mode characteristic, the preset power mode characteristic and the preset lifting operation characteristic includes a characteristic line expressing a relation between engine speed and the input torque of the HST pump, and
the lifting operation characteristic line is provided to diverge from the middle of the eco mode characteristic line.

\* \* \* \* \*